C. PFISTER.
NUT LOCK.
APPLICATION FILED SEPT. 20, 1905.

971,784.

Patented Oct. 4, 1910.

WITNESSES:
Robert Head
Edward A. McCue

INVENTOR
Charles Pfister.
BY
Thomas C. Patterson
ATTORNEY

UNITED STATES PATENT OFFICE.

CHARLES PFISTER, OF NEW YORK, N. Y.

NUT-LOCK.

971,784. Specification of Letters Patent. Patented Oct. 4, 1910.

Application filed September 20, 1905. Serial No. 279,282.

*To all whom it may concern:*

Be it known that I, CHARLES PFISTER, a citizen of the United States, residing in the borough of Manhattan, city of New York, county of New York, State of New York, have invented certain new and useful Improvements in Nut-Locks, of which the following is a specification.

This invention relates to nut-locks in which provision is made for fastening a nut in place, and preventing its becoming loose by the jarring or tremulous motion of the machinery; and its principal object is to improve and simplify the means for securing the locking thereof, particularly with a view to positiveness of action.

Heretofore bolts and nuts have been used for securing fish-plates to rails to make a continuous rail for railroad purposes. The great weight and strain of the engines, &c., on the rails while operating, cause the nuts to jar off the bolts, thereby allowing the rails to separate, which impairs the safety in operating engines, &c., on the rails, and is often the cause of serious accidents; but the present improvements provide for the locking of the fish-plates securely to the rails, thus preventing the possibility of the rails separating. Provision is also made for unlocking the nut-lock without destroying any of its parts.

Other objects and advantages will hereinafter appear.

Figure 1:
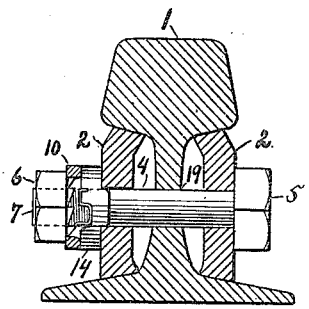
Figure 2:
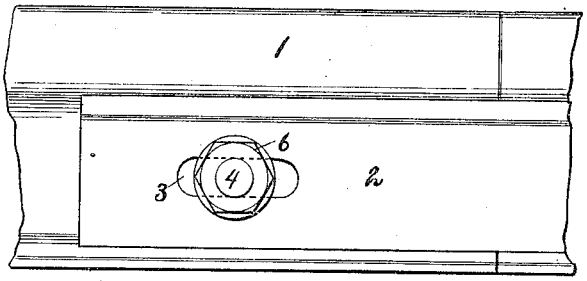
Figure 3:
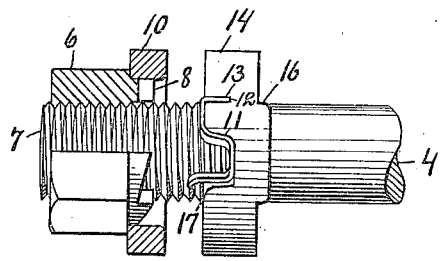
Figure 4:
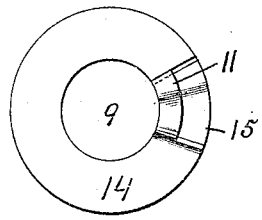
Figure 5:
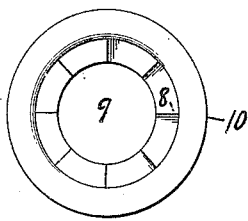
Figure 6:
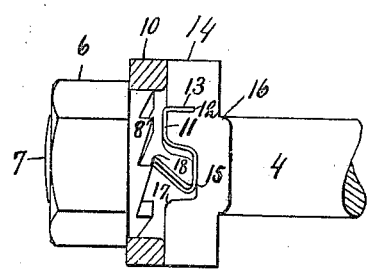

In the drawings forming part of this specification, Figure 1 is a vertical section of a rail and fish-plates locked with my improved nut-lock. Fig. 2 is a side elevation of a rail and fish-plate secured by my improved nut-lock. Fig. 3 is a sectional view showing the spring and nut-lock before locking. Fig. 4 is a plan of the spring holding washer and spring. Fig. 5 is an inner face view of the nut showing the ratchet teeth. Fig. 6 is a sectional view of the nut-lock showing the spring depressed while unlocking the nut.

In the several views like parts are identified by like signs.

Referring to Fig. 1 of the drawing, 1 designates a rail and 2, 2 fish-plates having longitudinal slots 3; 4 a bolt, 5 the head thereof, and 6 the nut. The nut 6 which is adapted to be screwed on the threaded end 7 of the bolt 4, is provided on its inner face with a series of ratchet teeth 8, arranged circularly, radiating from the hole 9, said teeth being inclosed on the outside by a removable collar 10, which fits over the reduced inner end of the nut 6. The ratchet teeth 8 on the nut 6 are adapted to be engaged by a locking member 11 in the nature of an S shaped spring, which has one end 12 secured in a kerf 13 formed in the washer 14 and the opposite free end thereof operatively seated in a recess 15 formed in the washer 14. The washer 14 is provided with a projection 16, which is adapted to extend into the slot 3 of the fish-plate 2, in order to prevent the washer 14 from turning during the locking operation. One edge 17 of the recess 15 is rounded as shown in Figs. 1, 3 and 6 to facilitate the operation of the end 18 of the locking member, during the locking operation.

The operation is as follows: The rails are placed in position and the fish-plates 2, 2 are placed on the sides of the web of the rails, and adjacent to the joint formed by the rails, so that the slots 3 in the fish-plates 2, 2 will register with the hole 19 in the rail. The bolt 4 is passed through the slots 3 in the fish-plates 2, 2 and the hole 19 in the rail, the threaded end 7 of the bolt 4 projecting beyond the face of the fish-plates 2, 2 sufficient to allow the nut 6 and the washer 14 to be secured thereto. The washer 14 is now slid upon the bolt 4, and the projection 16 extends into the slot 3 in the fish-plate 2 until the inner face of the washer 14 rests against the fish-plate 2, the side of the washer 14 containing the locking member 11 being outside. The nut 6 may now be screwed up on the threaded end 7 of the bolt 4, with the face having the ratchet teeth 8 inward, so as to contact with the locking member 11 in the washer 14. As soon as the ratchet teeth 8 of the nut 6 come into contact with the end 18 of the locking member 11, the ratchet teeth 8 will ride over the end 18 of the locking member 11, depressing the end 18 sufficient to allow the nut 6 to be screwed up on the bolt 4, until the face of the collar 10 on the nut 6 is forced tight against the washer 14, when the end 18 of the locking member 11 will spring back to its normal position in one of the spaces between the ratchet teeth 8, and engage one of the ratchet teeth 8 in the nut 6 if any attempt is made to unscrew or turn the nut off the bolt 4. If however, it is desired to remove the nut 6, it can be accomplished with the use of a suitable wrench, as the end 18 of the locking member 11 can be pressed into the recess 15 in the washer 14, which will free the end 18 of the locking member 11 from the ratchet teeth 8, and permit the nut 6 to be unscrewed off the bolt 7 without injury to any of the parts of the nut-lock.

Having thus described my invention, I claim:

1. The combination of a bolt, a nut threaded on the bolt having the inner portion thereof of reduced diameter and provided with ratchet teeth on its inner face, a removable collar fitting over the reduced portion of the nut and inclosing the ratchet teeth, a washer, and an S shaped spring pawl having one end affixed in a kerf of the washer and the opposite free end thereof seated in a recess of the washer and adapted to engage with the ratchet teeth of the nut.

2. The combination of a bolt, a nut threaded on the bolt having the inner portion thereof of reduced diameter and provided with ratchet teeth on its inner face, a removable collar fitting over the reduced portion of the nut and inclosing the ratchet teeth, and a washer on which said collar seats, arranged on the bolt having a spring pawl fixed thereto adapted to engage with the teeth of the nut and lock the latter in place.

CHARLES PFISTER.

Witnesses:
FREDERICK HANITSCH,
ABRAHAM AMPOLSE.